(12) United States Patent
Bradford et al.

(10) Patent No.: US 8,237,310 B2
(45) Date of Patent: Aug. 7, 2012

(54) VOLTAGE MONITORING CIRCUIT FOR REDUNDANT POWER SYSTEMS

(75) Inventors: Curtis Bradford, Los Gatos, CA (US); Surendra Patel, Tracy, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 292 days.

(21) Appl. No.: 12/616,823

(22) Filed: Nov. 12, 2009

(65) Prior Publication Data

US 2011/0109160 A1    May 12, 2011

(51) Int. Cl.
*H02J 1/00*    (2006.01)

(52) U.S. Cl. ............................................. 307/80
(58) Field of Classification Search .................... 307/80
See application file for complete search history.

(56) References Cited

U.S. PATENT DOCUMENTS

2009/0158070 A1*  6/2009  Gruendler .................... 713/340
* cited by examiner

*Primary Examiner* — Robert L. Deberadinis
(74) *Attorney, Agent, or Firm* — Harrity & Harrity, LLP (57) ABSTRACT

A redundant power system determines a rate of decline of a voltage supplied by a remote power source. The redundant power system further supplies power from a redundant power source to the remote power source based on the determined rate of decline of the voltage supplied by the remote power source.

23 Claims, 5 Drawing Sheets

VOLTAGE MONITORING CIRCUIT FOR REDUNDANT POWER SYSTEMS

BACKGROUND

A redundant power system, which includes a redundant power source, monitors remote power sources to detect when any of the remote power sources requires take-over by the redundant power system before the operation of the loads of the remote power sources may be affected. If any of the remote power sources are failing because of a catastrophic failure, such as a shorted load, then engaging the redundant power system may cause the redundant power source to overload and fail. If the redundant power source is supplying power to other remote power sources at the same time, then all of the remote power sources in the system may have their operation interrupted.

A number of prior solutions to the problem of supplying redundant power to failing remote power sources exist. In one prior solution, the redundant power source is engaged as soon as the remote power source begins to fail and then, if the redundant power source experiences a drop in voltage or excess current draw, then an attempt is made to withdraw the redundant power source as quickly as possible. This solution can be risky because the time allowed to detect the abnormal event, and to disengage to the redundant power source, can be very short and once the redundant power source is stressed, the redundant power source may require an extended period of time to recover. This extended recovery period can interrupt the operation of the system even after the abnormal, failed load is removed.

In another prior solution, the redundant power source may be slowly engaged such that any abnormal condition may be detected before the redundant power source experiences excess stress. There are several drawbacks to this prior solution. One drawback is that it takes longer to fully take over for the remote power source and, therefore, it is difficult to guarantee that the remote power source's operation is not interrupted (e.g., voltage becomes too low). A second drawback involves the cost of this solution. A circuit that can slowly feed power in increasing and precise amounts is more complicated and, therefore, more expensive, and additionally requires an accurate/sensitive measuring capability in order to detect any abnormal current draw. A third drawback is that high power may be dissipated in this type of circuit when it is not fully engaged. Dissipation of this extra power can be expensive and may increase the size of the circuit.

SUMMARY

In accordance with one embodiment, a method may include determining if a voltage associated with a remote power source drops from a nominal voltage to equal a first threshold voltage that is less than the nominal voltage, and initiating a timer interval when the voltage associated with the remote power source drops to equal the first threshold voltage. The method may further include determining if the voltage associated with the remote power source drops, prior to the timer interval expiring, to equal a second threshold voltage that is less than the first threshold voltage, and supplying power from a redundant power source to the remote power source when the voltage associated with the remote power source does not drop to equal the second threshold voltage prior to the timer interval expiring.

In another implementation, a system may include a first comparator to determine if a voltage associated with a remote power source varies from a nominal voltage to equal a first threshold voltage that is different than the nominal voltage, and a timer to initiate a timer interval when the voltage associated with the remote power source equals the first threshold voltage. The system may further include a second comparator to determine if the voltage associated with the remote power source drops, prior to the timer interval expiring, to equal a second voltage threshold that is less than the first threshold voltage, and a control circuit to supply power from a redundant power source to the remote power source when the voltage associated with the remote power source does not drop to equal the second threshold voltage prior to the timer interval expiring.

In still another implementation, a method may include determining a rate of decline of a first voltage supplied by a remote power source. The method may further include supplying power from a redundant power source to the remote power source based on the determined rate of decline of the first voltage supplied by the remote power source.

In yet another implementation, a system may include a redundant power source; and a circuit to: determine a rate of decline of a first voltage associated with a remote power source, where, when determining the rate of decline of the first voltage associated with the remote power source, the circuit is to: determine if the first voltage associated with the remote power source drops between two voltage thresholds within a specified time interval, where a first voltage threshold of the two voltage thresholds is greater than a second voltage threshold. The circuit may further supply power from the redundant power source to the remote power source based on the determined rate of decline of the first voltage associated with the remote power source.

In an additional implementation, a system may include means for determining a rate of decline of a voltage supplied by a remote power source, and means for supplying power from the redundant power source to the remote power source when the rate of decline of the voltage supplied by the remote power source meets a first criterion. The system may further include means for preventing a supply of power from the redundant power source to the remote power source when the rate of decline of the voltage supplied by the remote power source meets a second criterion.

BRIEF DESCRIPTION OF THE DRAWINGS

The accompanying drawings, which are incorporated in and constitute a part of this specification, illustrate one or more embodiments described herein and, together with the description, explain the invention. In the drawings.

DETAILED DESCRIPTION

The following detailed description refers to the accompanying drawings. The same reference numbers may be used in different drawings to identify the same or similar elements. Also, the following detailed description does not limit the invention. Instead, the scope of the invention is defined by the appended claims and equivalents.

Exemplary embodiments described herein implement a redundant power system in which a redundant power source supplies power to a failing remote power source based on an analysis of a rate of decline in an output voltage of the failing remote power source. As described herein, the redundant power system may include a remote power source monitoring and control circuit that may further include comparators which may compare the remote power source's output voltage to at least two pre-specified voltage thresholds. The two pre-specified voltage thresholds, and a timer interval, may be selected (e.g., programmed) based on a maximum rate of decline that is deemed to be acceptable in the remote power source's output voltage (e.g., the maximum rate of decline may be set by a system operator). A first comparator may compare the remote power source's output voltage with a first voltage threshold, and if the comparison indicates that the remote power source's output voltage has fallen to a voltage level that is equal to the first voltage threshold, a pre-specified timer interval may be started. A second comparator may compare the remote power source's output voltage with a second voltage threshold, and if the comparison indicates that the remote power source's output voltage has not fallen to a voltage level that is equal to the second voltage threshold, prior to the expiration of the time interval, then a control circuit may switch a redundant power source through to the remote power source. In this case, the rate of decline of the voltage output of the remote power source is less than a maximum acceptable rate of decline (i.e., a rate of decline which may indicate a normal condition with respect to the remote power source). If the comparison by the second comparator indicates that the remote power source's output voltage has fallen to a voltage level that is equal to the second voltage threshold, prior to the expiration of the timer interval, then the control circuit may not switch the redundant power source through to the remote power source. In this case, the rate of decline of the voltage output of the remote power source is greater than the maximum acceptable rate of decline (i.e., indicating an abnormal condition with respect to the remote power source).

The remote power source monitoring and control circuit described herein, therefore, enables the supply of redundant power to a failing remote power source, while protecting the redundant power source from an abnormal failure (e.g., a shorting of a load), in a programmable manner that allows the circuit to function in a wide variety of applications with different voltages and loads. The remote power source monitoring and control circuit described herein may be inexpensive, small in physical size (i.e., due to the minimal number of components), and power efficient relative to existing solutions for providing redundant power to failing power sources.

Exemplary Redundant Power System

Figure 1:
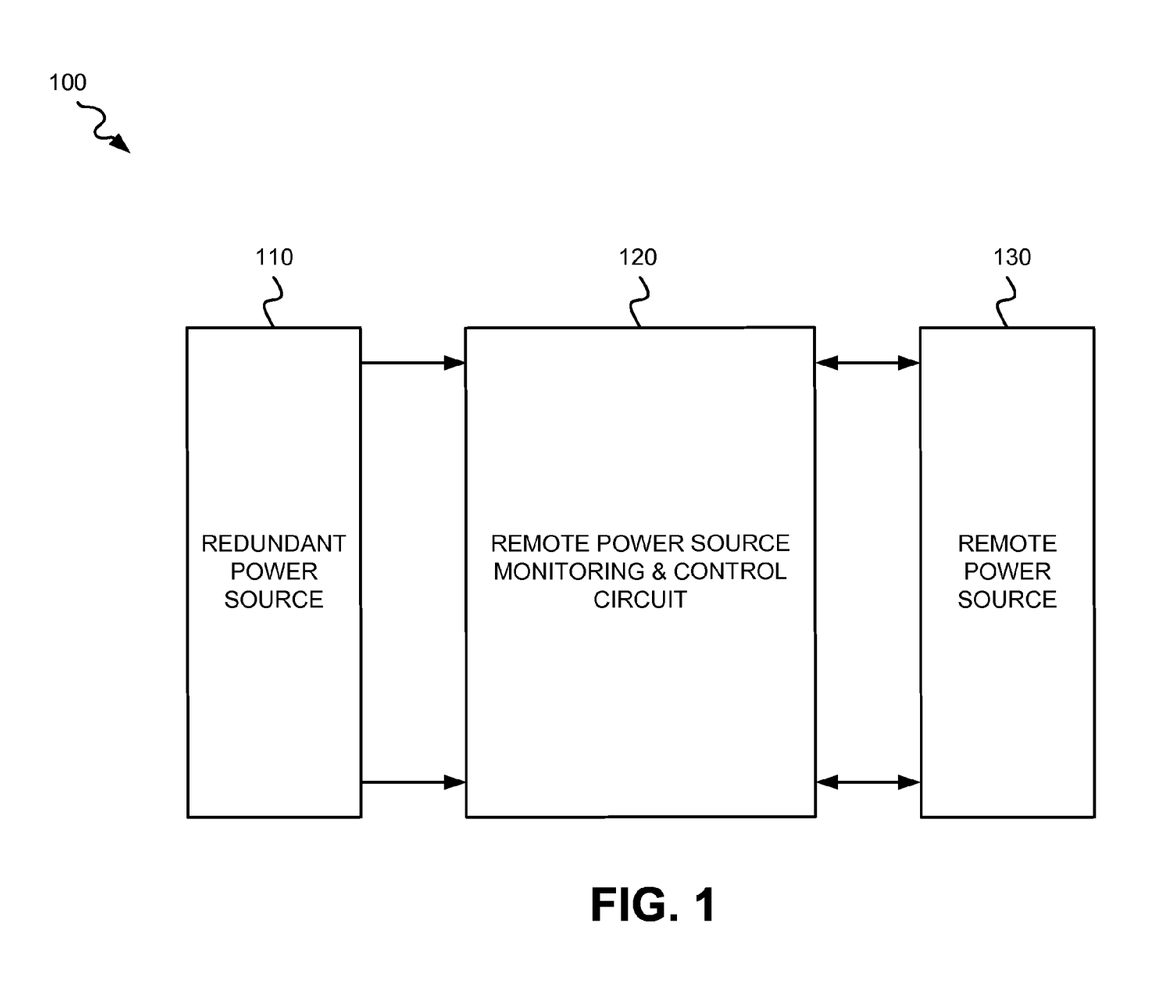
FIG. 1 is a diagram of an exemplary redundant power system in which a redundant power source may be selectively switched in to take over supplying power to a remote power source.

FIG. 1 is a diagram of an exemplary redundant power system 100 in which a redundant power source 110 may be selectively switched in to supply power to a remote power source 130. As shown in FIG. 1, redundant power system 100 may include a redundant power source 110, a remote power source monitoring and control circuit 120, and a remote power source 130.

Redundant power source 110 may include a power source, such as, for example, a power supply that may supply power (e.g., voltage and current) to remote power source 130 via a switching mechanism implemented by remote power source monitoring and control circuit 120.

Remote power source monitoring and control circuit 120 may include circuitry for analyzing a voltage output of remote power source 130, and for determining a rate of decline of the voltage output of remote power source 130. If the rate of decline of the voltage output of remote power source 130 indicates that an abnormal condition of remote power source 130 exists (e.g., a shorted load), then remote power source monitoring and control circuit 120 may not attempt to switch redundant power source 110 through to remote power source 130. If, however, the rate of decline of the voltage output of remote power source 130 does not indicate that an abnormal condition of remote power source 130 exists, then remote power source monitoring and control circuit 120 may switch redundant power source 110 through to remote power source 130. Further details of exemplary components of remote power source monitoring and control circuit 120 is described below with respect to FIG. 2.

Remote power source 130 may supply power to one or more loads (not shown). Remote power source 130 may also be capable of receiving a voltage and current supplied from another power source (i.e., redundant power source 110) to maintain its supply of power to the one or more loads.

The number of components of redundant power system 100 depicted in FIG. 1 is exemplary. Fewer components, more components, or differently configured components than those shown may be included in system 100.

Exemplary Remote Power Source Monitoring & Control Circuit

Figure 2:
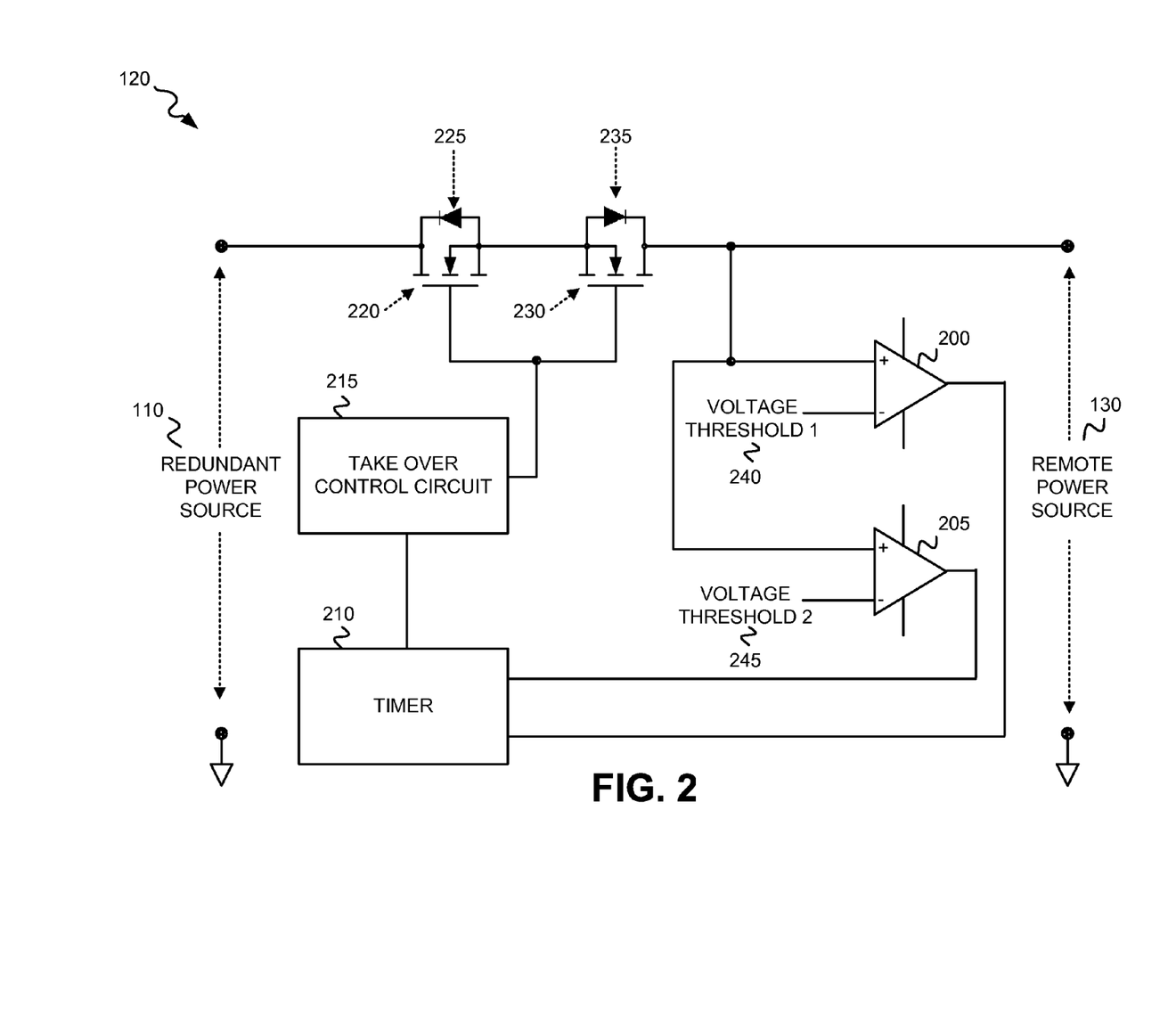
FIG. 2 is a diagram depicting exemplary components of the remote power source monitoring and control circuit of the system of FIG. 1.

FIG. 2 is a diagram depicting exemplary components of remote power source monitoring and control circuit 120 of system 100. As shown, remote power source monitoring and control circuit 120 may switch a connection between redundant power source 110 and remote power source 130 so as to supply redundant power source 110 to remote power source 130 based on an output voltage level of remote power source 130. More specifically, remote power source monitoring and control circuit 120 may switch a connection between redundant power source 110 and remote power source 130 based on a rate of decline in the output voltage of remote power source 130.

Remote power source monitoring and control circuit 120 may include comparators 200 and 205, timer 210, take over control circuit 215, N-channel Metal-Oxide-Semiconductor Field Effect Transistors (MOSFETs) 220 and 230, and diodes 225 and 235. Comparator 200 may compare a voltage output of remote power source 130 with a first voltage threshold (i.e., voltage threshold 1 240). If the voltage output of remote power source 130 falls such that it is equal to voltage threshold 1 240, then comparator 200 may supply a signal to timer 210 causing timer 210 to start a timer interval. Voltage threshold 1 240 may be pre-set, or may be programmable (e.g., via a digital to analog converter (DAC)).

Comparator 205 may compare a voltage output of remote power source 130 with a second voltage threshold (i.e., voltage threshold 2 245). If the voltage output of remote power source 130 falls such that it is equal to voltage threshold 2 245, then comparator 205 may supply a signal to timer 210 indicating that the voltage output of remote power source 130 is equal to voltage threshold 2 245. Voltage threshold 2 245 may be pre-set, or may be programmable (e.g., via a DAC).

Timer 210 may include a settable counter or programmable logic that may implement a timer interval. The timer interval may be pre-set, or may be a programmable duration of time.

Timer 210 may additionally include circuitry for receiving output signals from comparator 200 and comparator 205. Timer 210 may initiate the timer interval based on a signal from comparator 200. Timer 210 may additionally provide a signal to take over control circuit 215 indicating a rate of decline in the voltage output from remote power source 130. For example, timer 210 may provide a signal to take over control circuit 215 indicating whether the voltage output from remote power source 130 has fallen to equal voltage threshold 2 245 prior to the expiration of the timer interval implemented by timer 210. If the voltage output of remote power source 130 falls too quickly (i.e., a high rate of decline), then timer 210 may provide a signal to take over control circuit 215 indicating that an abnormal condition exists with respect to remote power source 130 (e.g., a shorted load). If the voltage output of remote power source 130 does not fall too quickly (i.e., an acceptable rate of decline), then timer 210 may provide a signal to take over control circuit 215 indicating that an abnormal condition does not exist with respect to remote power source 130.

Figure 3:
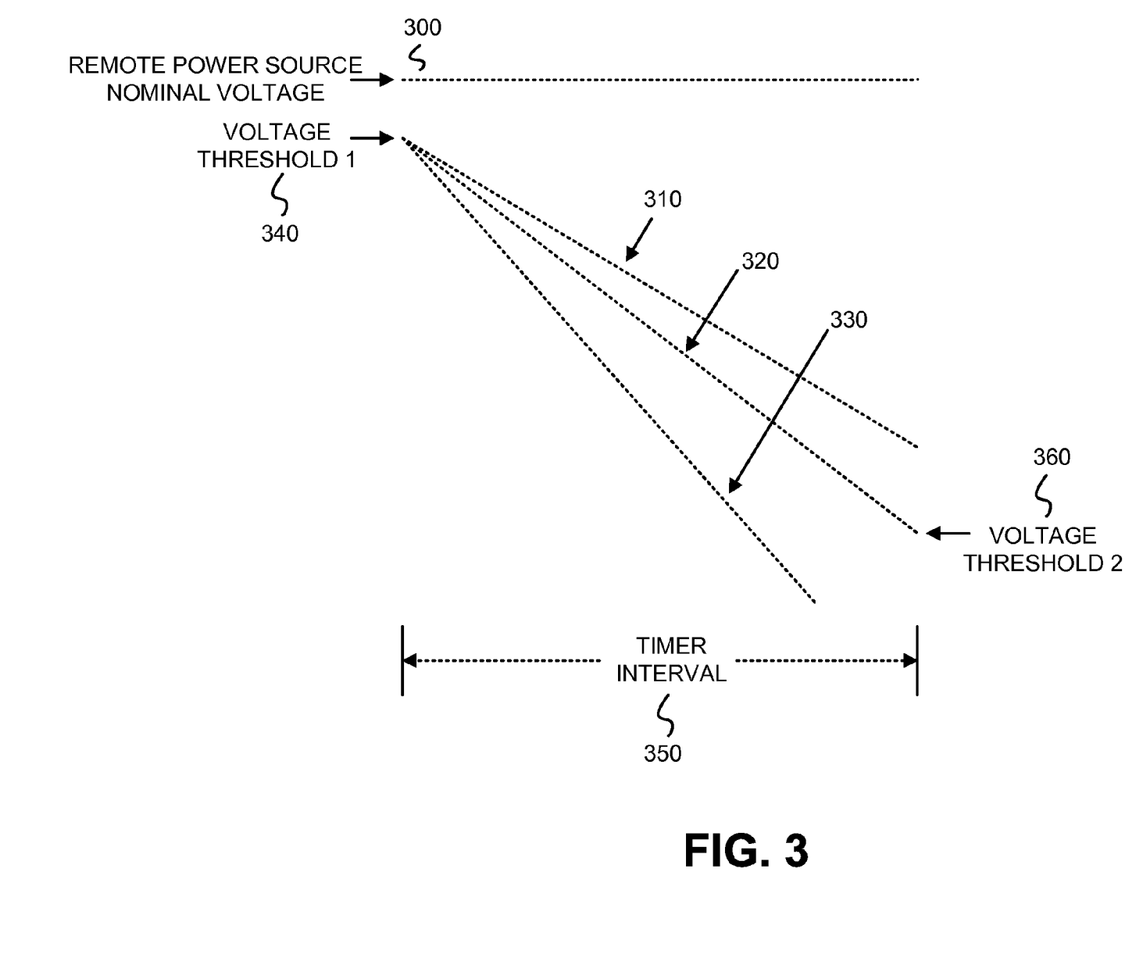
FIG. 3 graphically illustrates a rate of decline analysis of the voltage output from the remote power source of FIGS. 1 and 2.

FIG. 3 graphically illustrates a rate of decline analysis of the voltage output from remote power source 130. As shown in FIG. 3, remote power source 130 may initially have a nominal output voltage 300. The voltage output of remote power source 130 (shown by voltage output lines 310, 320 or 330) may fall, as remote power source 130 fails, such that the voltage output equals voltage threshold 1 340. Upon the voltage output of remote power source 130 equaling voltage threshold 1 340, timer 210 may initiate timer interval 350. A determination may then be made whether the rate of decline of the output voltage from remote power source 130 is sufficiently high. As shown in FIG. 3, it may be determined if the output voltage from remote power source 130 falls to equal voltage threshold 2 360 prior to the expiration of timer interval 350. If so, then it may be determined that an abnormal condition exists with respect to remote power source 130. If the output voltage from remote power source 130 does not fall such that it is equal to voltage threshold 2 360 prior to the expiration of timer interval 350, then it may be determined that an abnormal condition does not exist with respect to remote power source 130. FIG. 3 graphically depicts three separate examples of voltage declines for remote power source 130. Voltage output line 310 depicts an example in which the voltage output of remote power source 130 does not fall such that it is equal to voltage threshold 2 360 within timer interval 350. Voltage output lines 320 and 330 depict examples in which the voltage output of remote power source 130 does fall such that it is equal to voltage threshold 2 360 within timer interval 350. As shown, both examples of voltage output lines 320 and 330 have sufficiently high rates of decline of the voltage output of remote power source 130 as to indicate the existence of an abnormal condition with respect to remote power source 130.

Returning to FIG. 2, take over control circuit 215 may include circuitry that is capable of receiving a signal from timer 210 indicating whether an abnormal condition exists with respect to remote power source 130. The signal from timer 210 may indicate whether the voltage output from remote power source 130 has an acceptable rate of decline. Upon receipt of the signal from timer 210, subsequent to the voltage output from remote power source 130 declining to equal voltage threshold 1 240, where the signal from timer 210 indicates that an abnormal condition does not exist with respect to remote power source 130, take over control circuit 215 may supply a voltage level that turns on MOSFETs 220 and 230, causing power to be supplied from redundant power source 110 to remote power source 130. Take over control circuit 215, therefore, causes MOSFETs 220 and 230 to switch redundant power source 110 across to remote power source 130 if an abnormal condition does not exist with respect to remote power source 130. If the signal from timer 210 indicates that an abnormal condition exists with respect to remote power source 130 (e.g., a high rate of decline of remote power source 130's output voltage), take over control circuit 215 may supply a voltage level that turns off MOSFETs 220 and 230, electrically isolating redundant power source 110 from remote power source 130. Take over control circuit 215, therefore, causes MOSFETs 220 and 230 to switch off if an abnormal condition exists with respect to remote power source 130.

N-channel MOSFET 220 may include an N-channel MOSFET whose drain may be connected to redundant power source 110 and whose source may be connected to the source of MOSFET 230. Diode 225 may additionally be connected across the source and drain of MOSFET 220, where diode 225's cathode may be connected to the drain of MOSFET 220, and diode 225's anode may be connected to the source of MOSFET 220.

N-channel MOSFET 225 may include an N-channel MOSFET whose drain may be connected to remote power source 130 and whose source may be connected to the source of MOSFET 220. Diode 235 may additionally be connected across the source and drain of MOSFET 230, where diode 235's cathode may be connected to the drain of MOSFET 230 and diode 235's anode may be connected to the source of MOSFET 230.

The components depicted in FIG. 2 are exemplary. Remote power source monitoring and control circuit 120 may have more, fewer, different and/or differently arranged components than those shown in FIG. 2.

Figure 4A:
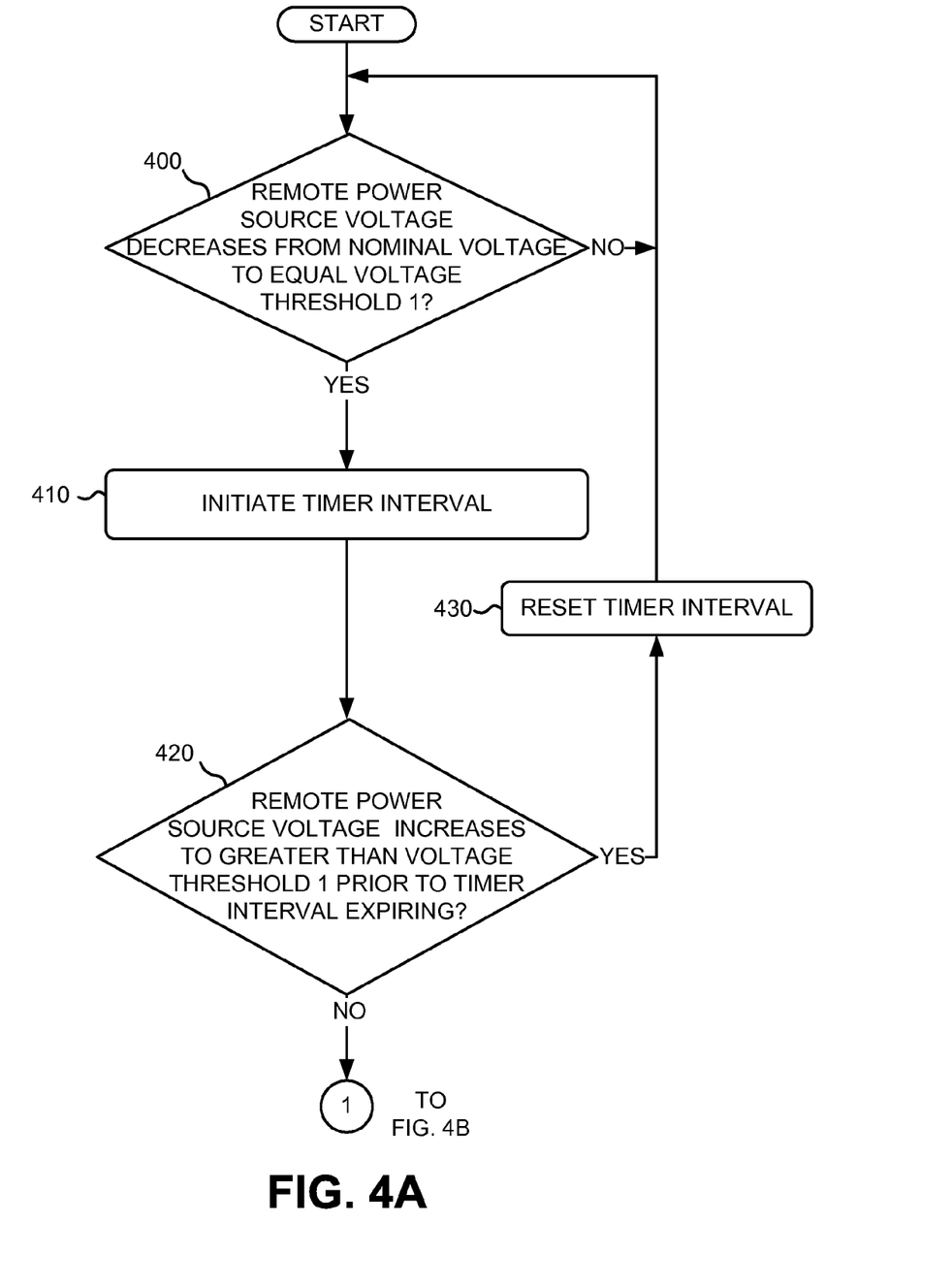
FIGS. 4A and 4B are flow charts that illustrate an exemplary process for supplying redundant power to a failing remote power source based on a rate of decline of a voltage output of the remote power source.
Figure 4B:
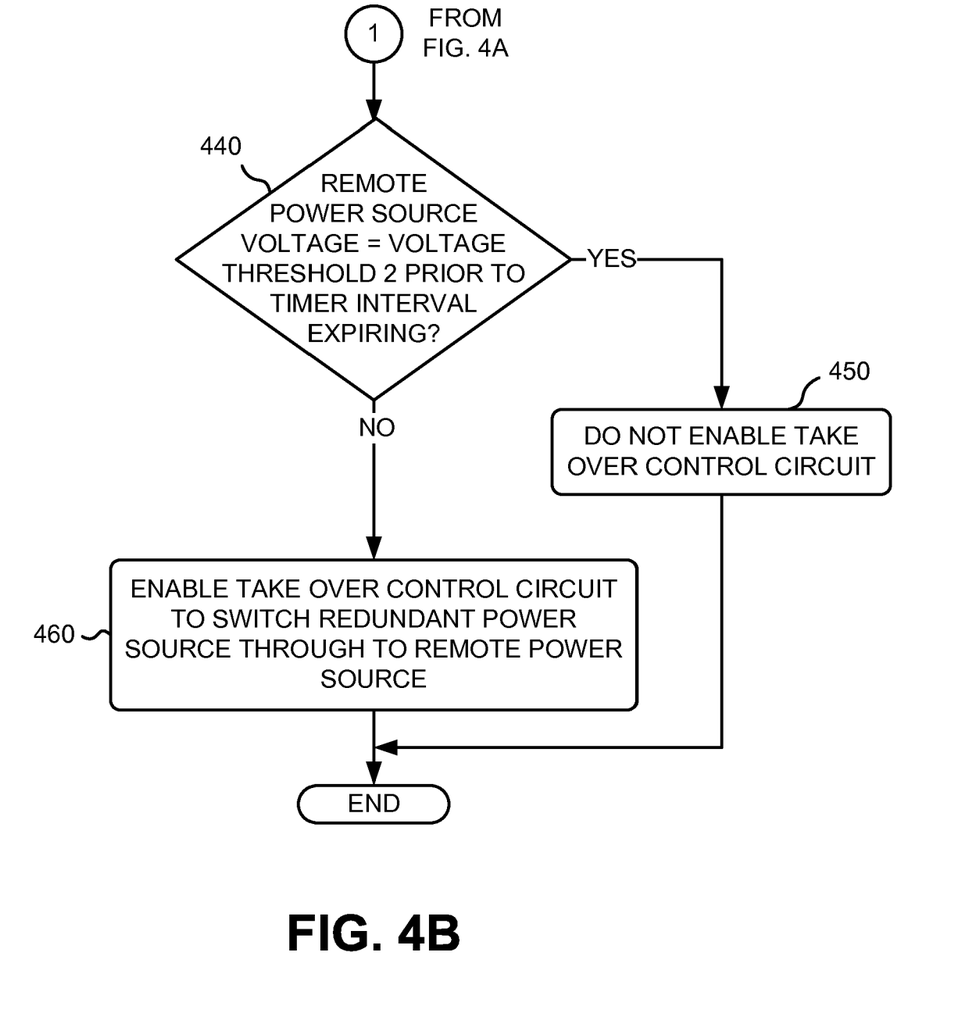

Exemplary Process for Supplying Redundant Power to a Failing Remote Power Source FIGS. 4A and 4B are flow charts that illustrate an exemplary process for supplying redundant power to a failing remote power source based on a rate of decline of a voltage output of the remote power source. The exemplary process of FIGS. 4A and 4B may be implemented by remote power source monitoring and control circuit 120. In other embodiments, some or all of the blocks described below may be performed by another component(s) of system 100, or by components not shown in FIG. 2.

The exemplary process may include determining if the voltage output of the remote power source decreases from a nominal voltage to equal Voltage Threshold 1 240 (block 400). Comparator 200 may compare the voltage output of remote power source 130 with voltage threshold 1 240 to determine if they are equal to one another. If the voltage of the remote power source is equal to Voltage Threshold 1 240 (block 400—YES), then the timer interval may be started (block 410). If comparator 200 determines that the voltage output of remote power source 130 equals voltage threshold 1 240, then comparator 200 may send a signal to timer 210. Upon receipt of the signal from comparator 200, timer 210 may start the timer interval. If the voltage of the remote power source is not equal to Voltage Threshold 1 240 (block 400—NO), then the exemplary process may loop at block 400 until the voltage of the remote power source is equal to Voltage Threshold 1 240.

It may be determined if the voltage output of the remote power source increases to greater than Voltage Threshold 1 240 prior to the timer interval expiring (block 420). Comparator 200 may compare the voltage output of remote power source 130 with Voltage Threshold 1 240 to determine if the voltage output has increased such that it is greater than Voltage Threshold 1 240 prior to the expiration of the timer interval. By analyzing the voltage output of the remote power source to determine if, after decreasing lower than Voltage Threshold 1 240, that the voltage output has increased again to greater than Voltage Threshold 1 240, the exemplary process may be able to ignore fluctuations in the voltage output in situations where the voltage output is self-correcting.

If the voltage output of the remote power source has increased such that the voltage output is greater than Voltage Threshold 1 240 prior to expiration of the timer interval (block 420—YES), then the timer interval may be reset (block 430) and the exemplary process may return to block 400). If the voltage output of the remote power source has not increased such that the voltage output is greater than Voltage Threshold 1 240 prior to expiration of the timer interval (block 420—NO), then it may be determined if the remote power source voltage equals Voltage Threshold 2 245 prior to expiration of the timer interval (block 440). During the timer interval (i.e., prior to expiration of the timer interval), comparator 205 may compare the voltage output of remote power source 130 with Voltage Threshold 2 245 to determine if they are equal to one another. If comparator 205 determines that the voltage output of remote power source 130 equals to Voltage Threshold 2 245, then comparator 205 may send a signal to timer 210. If the remote power source voltage equals Voltage Threshold 2 245 prior to expiration of the timer interval (block 440—YES), then take over control circuit 215 may not be enabled (block 450). The remote power source voltage equaling Voltage Threshold 2 245 prior to expiration of the timer interval may indicate an excessive rate of decline in the remote power source voltage, which may further indicate an abnormal condition of the remote power source (e.g., a shorted load). In this case, take over control circuit 215 may not switch redundant power source 110 through to remote power source 130.

If the remote power source voltage does not equal Voltage Threshold 2 245 prior to expiration of the timer (block 440—NO), then take over control circuit 215 may be enabled to switch redundant power source 110 through to remote power source 130 (block 460). Having the remote power source voltage not equal Voltage Threshold 2 245 prior to expiration of the timer interval may indicate that an excessive rate of decline in the remote power source voltage does not exist, further indicating that an abnormal condition of the remote power source does not exist. Referring to FIG. 2, take over control circuit 215 may supply a voltage level to MOSFETs 220 and 230, causing them to turn on and, thereby, to connect redundant power source 110 to remote power source 130.

CONCLUSION

As described herein, a redundant power system may be implemented in which a redundant power source supplies power to a failing remote power source based on an analysis of a rate of decline in an output voltage of the failing remote power source. The redundant power system described herein enables the supply of redundant power to the failing remote power source, while protecting the redundant power source from an abnormal failure (e.g., a shorting of a load), in a programmable manner that allows the system to function in a wide variety of applications with different voltages and loads.

The foregoing description of embodiments described herein provides illustration and description, but is not intended to be exhaustive or to limit the embodiments described herein to the precise form disclosed. Modifications and variations are possible in light of the above teachings or may be acquired from practice of the invention.

While a series of blocks has been described in FIGS. 4A and 4B, the order of the blocks may vary in other implementations. Also, non-dependent blocks may be performed in parallel. Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed:

1. A method, comprising:
   determining if a voltage associated with a remote power source drops from a nominal voltage to equal a first threshold voltage that is less than the nominal voltage;
   initiating a timer interval when the voltage associated with the remote power source drops to equal the first threshold voltage;
   determining if the voltage associated with the remote power source drops, prior to the timer interval expiring, to equal a second threshold voltage that is less than the first threshold voltage; and
   supplying power from a redundant power source to the remote power source when the voltage associated with the remote power source does not drop to equal the second threshold voltage prior to the timer interval expiring.

2. The method of claim 1, further comprising:
   preventing supply of the power from the redundant power source to the remote power source if the voltage associated with the remote power source, after dropping to equal the first threshold voltage, increases, prior to the timer interval expiring, to a voltage level greater than the first threshold voltage.

3. The method of claim 1, further comprising:
   preventing supply of the power from the redundant power source to the remote power source when the voltage associated with the remote power source drops to equal the second threshold voltage prior to the timer interval expiring.

4. The method of claim 3, where the voltage associated with the remote power source dropping to equal the second threshold voltage prior to the timer interval expiring indicates a certain rate of decline in the voltage associated with the remote power source.

5. The method of claim 1, where the first threshold voltage and the second threshold voltage are programmable.

6. The method of claim 1, where the timer interval is programmable.

7. The method of claim 1, where supplying a redundant power source to the remote power source comprises:
   switching, via two series connected metal-oxide-semiconductor field effect transistors (MOSFETs), the redundant power source to the remote power source.

8. A system, comprising:
a first comparator to determine if a voltage associated with a remote power source varies from a nominal voltage to equal a first threshold voltage that is different than the nominal voltage;
a timer to initiate a timer interval when the voltage associated with the remote power source equals the first threshold voltage;
a second comparator to determine if the voltage associated with the remote power source drops, prior to the timer interval expiring, to equal a second voltage threshold that is less than the first threshold voltage; and
a control circuit to supply power from a redundant power source to the remote power source when the voltage associated with the remote power source does not drop to equal the second threshold voltage prior to the timer interval expiring.

9. The system of claim 8, where the control circuit is further to prevent supply of the power from the redundant power source to the remote power source when the voltage associated with the remote power source drops to equal the second threshold voltage prior to the timer interval expiring.

10. The system of claim 8, where the control circuit is further to prevent supply of the power from the redundant power source to the remote power source if the voltage associated with the remote power source, after dropping to equal the first threshold voltage, increases, prior to the timer interval expiring, to a voltage level greater than the first threshold voltage.

11. The system of claim 8, where the first threshold voltage and the second threshold voltage are programmable.

12. The system of claim 8, where the timer interval is programmable.

13. The system of claim 8, where, when supplying the power from the redundant power source to the remote power source, the control circuit is to:
switch, using two series connected metal-oxide-semiconductor field effect transistors (MOSFETs), the redundant power source to the remote power source.

14. A method, comprising:
determining a rate of decline of a first voltage supplied by a remote power source; and
supplying power from a redundant power source to the remote power source based on the determined rate of decline of the first voltage supplied by the remote power source.

15. The method of claim 14, where determining the rate of decline of the voltage supplied by the remote power source comprises:
determining if the first voltage supplied by the remote power source drops between two voltage thresholds within a specified time interval, where a first voltage threshold of the two voltage thresholds is greater than a second voltage threshold.

16. The method of claim 14, where supplying the power from the redundant power source to the remote power source comprises:
applying a second voltage to a switch to switch the redundant power source to the remote power source based on the rate of decline of the first voltage supplied by the remote power source.

17. The method of claim 14, where supplying the redundant power source to the remote power source further comprises:
applying a second voltage to two series connected field effect transistors (FETs) to switch the redundant power source through the two series connected FETs to the remote power source based on the rate of decline of the first voltage supplied by the remote power source.

18. The method of claim 15, where the first and second voltage thresholds are programmable voltage thresholds.

19. A system, comprising:
a redundant power source; and
a circuit to:
determine a rate of decline of a first voltage associated with a remote power source, where, when determining the rate of decline of the first voltage associated with the remote power source, the circuit is to:
determine if the first voltage associated with the remote power source drops between two voltage thresholds within a specified time interval, where a first voltage threshold of the two voltage thresholds is greater than a second voltage threshold; and
supply power from the redundant power source to the remote power source based on the determined rate of decline of the first voltage associated with the remote power source.

20. The system of claim 19, where, when supplying the power from the redundant power source to the remote power source, the circuit is to:
apply a second voltage to a switch to switch the redundant power source to the remote power source based on the rate of decline of the first voltage supplied by the remote power source.

21. The system of claim 20, where the switch comprises two series connected field effect transistors (FETs).

22. The system of claim 19, where the first and second voltage thresholds are programmable voltage thresholds.

23. The system of claim 22, where the specified time interval is programmable.

* * * * *